US012543653B2

(12) United States Patent
Dreer (10) Patent No.: US 12,543,653 B2
(45) Date of Patent: Feb. 10, 2026

(54) FORAGE HARVESTER HAVING REPLACEABLE ROLLER LOCATION PLATES

(71) Applicant: AGCO International GmbH, Neuhausen (CH)

(72) Inventor: Constantin Dreer, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 412 days.

(21) Appl. No.: 18/343,530

(22) Filed: Jun. 28, 2023

(65) Prior Publication Data

US 2024/0016094 A1 Jan. 18, 2024

(30) Foreign Application Priority Data

Jul. 13, 2022 (GB) .................................... 2210282

(51) Int. Cl.
*A01D 43/10* (2006.01)
*A01D 82/02* (2006.01)

(52) U.S. Cl.
CPC ........... *A01D 82/02* (2013.01); *A01D 43/107* (2013.01)

(58) Field of Classification Search
CPC ...... A01D 82/00; A01D 82/02; A01D 43/107; A01D 43/088; B02C 4/30
See application file for complete search history.

(56) References Cited

U.S. PATENT DOCUMENTS

| | | | |
|---|---|---|---|
| 616,469 A * | 12/1898 | Jones | B02C 4/283 241/141 |
| 4,082,232 A * | 4/1978 | Brewer | B02C 18/184 241/243 |
| 5,395,057 A * | 3/1995 | Williams, Jr. | B02C 18/142 241/285.2 |
| 6,955,034 B1 | 10/2005 | Blakeslee et al. | |
| 10,307,764 B2 * | 6/2019 | Petack | B02C 4/30 |
| 2004/0261388 A1 | 12/2004 | Scherer | |
| 2012/0266581 A1 * | 10/2012 | Dreer | A01D 43/088 56/16.4 B |

(Continued)

FOREIGN PATENT DOCUMENTS

CN 114009218 A 2/2022

OTHER PUBLICATIONS

European Patent Office, Search Report for EP Application No. EP23179980 dated Dec. 4, 2023, 6 pages.

(Continued)

*Primary Examiner* — Joseph M Rocca
*Assistant Examiner* — Julia C Tran (57) ABSTRACT

A forage harvester cracker unit assembly for retention of first and second cracker rollers, each of the first and second cracker rollers having first and second ends and sealing units fitted at each of the first and second ends. The forage harvester cracker unit assembly comprises an upper housing having left and right hand sides, and a lower housing having left and right hand sides. The forage harvester cracker unit assembly further comprises first and second sets of replaceable cracker roller sealing unit location plates, each set comprising an upper cracker roller sealing unit location plate and a lower cracker roller sealing unit location plate for location at a respective left or right hand side of a respective upper or lower housing.

2 Claims, 8 Drawing Sheets

(56) References Cited

U.S. PATENT DOCUMENTS

2014/0263777 A1* 9/2014 Anderson, Jr. .......... B02C 4/42
                                                      241/34
2021/0092903 A1    4/2021 Gross et al.

OTHER PUBLICATIONS

UK Intellectual Property Office, Search Report for GB Application No. GB2210282.6 dated Dec. 28, 2022, 4 pages.
UK Intellectual Property Office, Search Report for related UK Application No. GB2210282.6, dated Dec. 28, 2022, 4 pages.

* cited by examiner

FORAGE HARVESTER HAVING REPLACEABLE ROLLER LOCATION PLATES

FIELD OF THE INVENTION

The present invention relates to a forage harvester and in particular to improvements in a cracker unit of a forage harvester.

BACKGROUND

It is known to provide forage harvesters with a cracker unit. The cracker unit includes opposing cracker rollers through which harvested crop is fed. The harvested crop is fed though a chopper unit and into the cracker unit where it is squeezed and crushed between the cracker rollers before being fed to a discharge spout. A drive belt of suitable size is located around a drive gear or pulley and pulleys mounted to an end of each of the cracker rollers.

From time to time an operator of the forage harvester may wish to change the selection of cracker rollers used in the cracker unit. This involves removing the cracker unit from the forage harvester and replacing at least one of the cracker rollers. Different diameters of cracker roller often have different diameters of the associated cracker roller pulleys.

Typically, a first cracker roller will be located in a fixed position and a second cracker roller is adjustable in position in relation to the first cracker roller in order to control the separation of the cracker rollers as desired by an operator of the forage harvester. However, when replacing a given cracker roller with one of a different diameter it also necessary, and expensive, to replace the side walls of the cracker unit in order to provide a suitable revised initial location for the replacement cracker roller.

It is an advantage of the present invention that this problem is addressed. Other advantages of the present invention will be apparent from the present disclosure.

SUMMARY OF THE INVENTION

According to a first aspect of the present invention, in a forage harvester cracker unit assembly for retention of first and second cracker rollers, each of the first and second cracker rollers having first and second ends and sealing units fitted at each of the first and second ends, the forage harvester cracker unit assembly comprises an upper housing having left and right hand sides, and a lower housing having left and right hand sides and wherein the forage harvester cracker unit assembly further comprises first and second sets of replaceable cracker roller sealing unit location plates, each set comprising an upper cracker roller sealing unit location plate and a lower cracker roller sealing unit location plate for location at a respective left or right hand side of a respective upper or lower housing, characterised in that each lower replaceable cracker roller sealing unit location plate comprises an upper linear peripheral portion and a lower peripheral portion, the upper linear peripheral portion being provided with a part elliptical cut out portion and a part circular cut out portion, each of the part elliptical cut out portion and the part circular cut out portion being provided with a depending V-shaped notch and the lower peripheral portion adapted to fit an inner surface of the lower housing of the cracker unit.

This arrangement has as an advantage that an operator need not replace the side walls of the cracker unit when replacing the cracker rollers but only the relevant replaceable cracker roller sealing unit location plates.

Preferably, each upper replaceable cracker roller sealing unit location plate comprises a lower peripheral portion and an upper linear peripheral portion, the lower linear peripheral portion being provided with a part elliptical cut out portion and a part circular cut out portion, and the upper peripheral portion adapted to fit an inner surface of the upper housing of the cracker unit.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
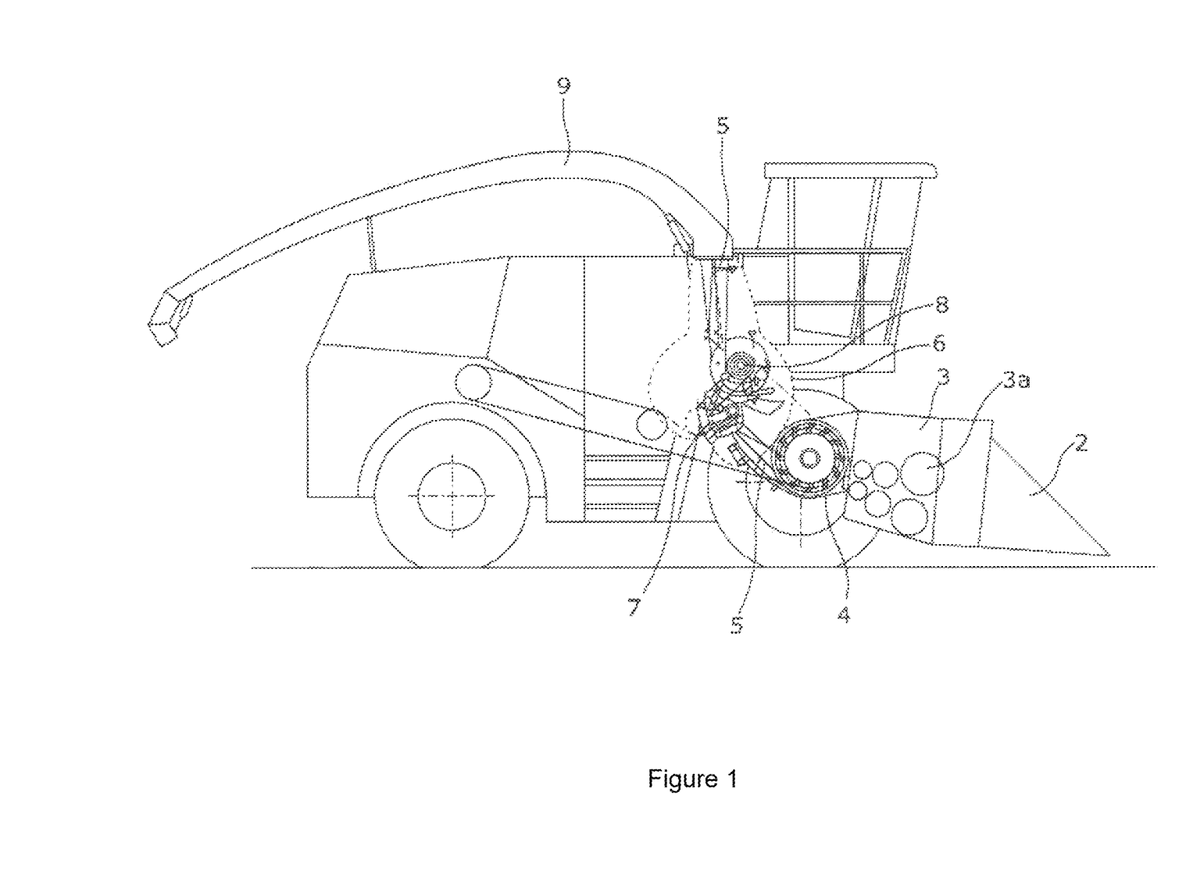
FIG. 1 shows a schematic side view of a forage harvester.

FIG. 1 shows a forage harvester provided with a front attachment 2 such as a header which contains cutting equipment for cutting and harvesting a crop. The cut and harvested crop is fed through a series of compression rolls 3a in a compression roller housing 3 to a chopper drum 4 where the harvested crop is chopped into smaller pieces. The chopped crop passes through a duct 5 and is optionally directed into a cracker unit 6 where the crop is further crushed and threshed. The harvested crop is then blown upwards along a duct 5 by an accelerator 8 and exits through a spout 9.

Figure 2:
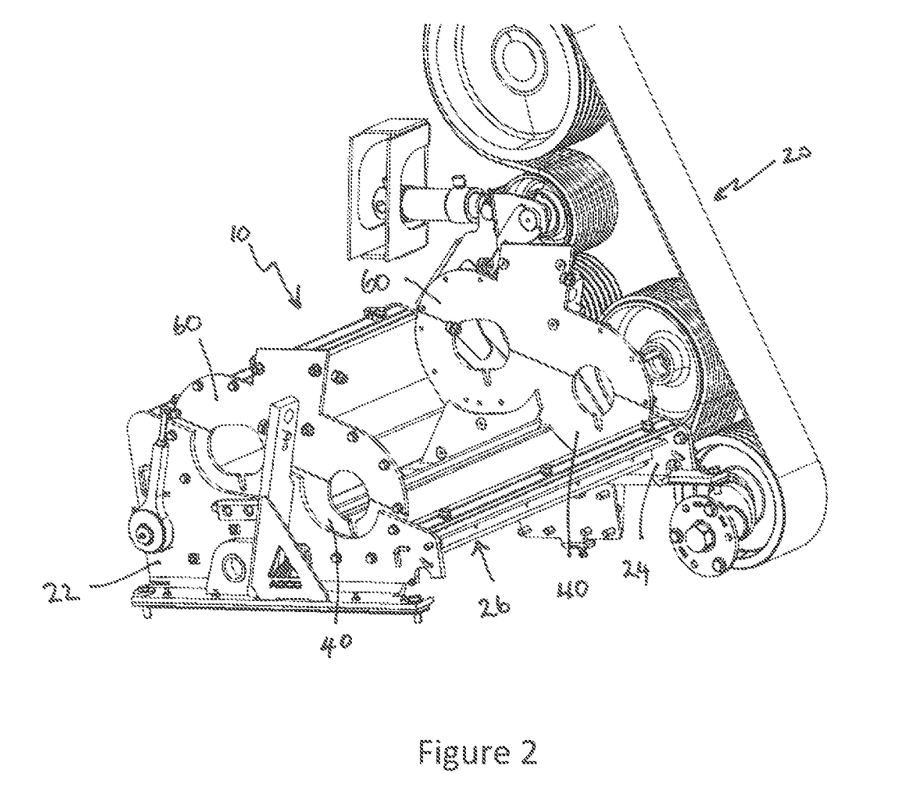
FIG. 2 shows an isometric view of certain elements of a cracker unit of a forage harvester in accordance with the present invention
Figure 3:
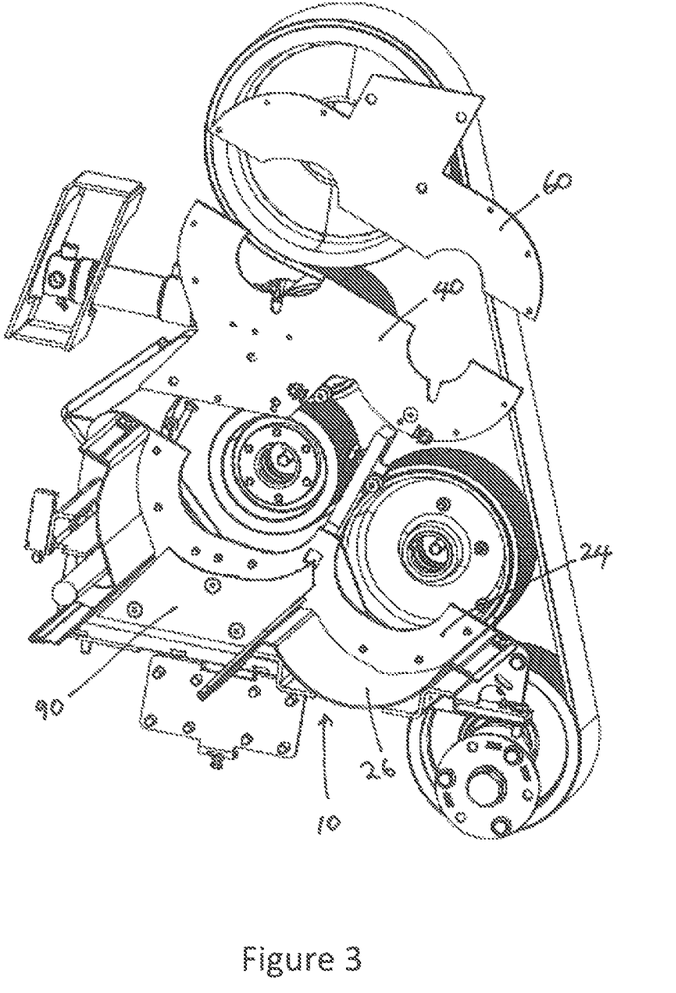
FIG. 3 shows an isometric view of certain elements of a cracker unit of a forage harvester in accordance with the present invention.
Figure 4:
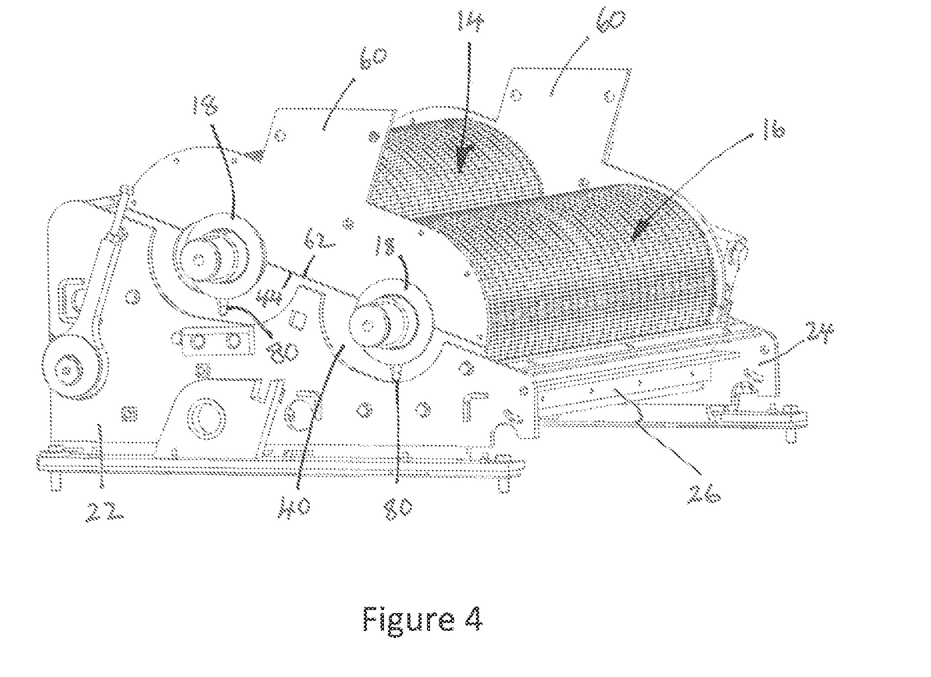
FIG. 4 shows a detailed view of some of the elements of the cracker unit of FIG. 3.

With reference to FIGS. 2 to 8, elements of a cracker unit 6 in accordance with the present invention are shown in more detail. The cracker unit 6 includes a lower housing 10 and an upper housing 12 (FIG. 2). First and second cracker rollers 14,16 are releasably mounted to the lower housing 10. Each of the first and second cracker rollers 14,16 are fitted with sealing units 18 at respective first and second ends.

The lower housing 10 of the cracker unit 6 and the drive arrangement 20 for the cracker unit 6 are mounted on a frame of the forage harvester. The upper housing 12 is releasably secured to the lower housing 10 and may be removed to provide access to the cracker rollers 14,16 for inspection, maintenance or exchange of the cracker rollers 14,16. The lower housing 10 can be releasably attached to the frame to allow the lower housing 10 and the associated cracker rollers 14,16 to be removed from the forage harvester.

Together the upper and lower housings 10,12 and the associated cracker rollers 14,16 serve to provide a rigid enclosure through which the cut crop passes while being squeezed and crushed between the cracker rollers 14,16 before being fed to the discharge spout 9.

Figure 6:
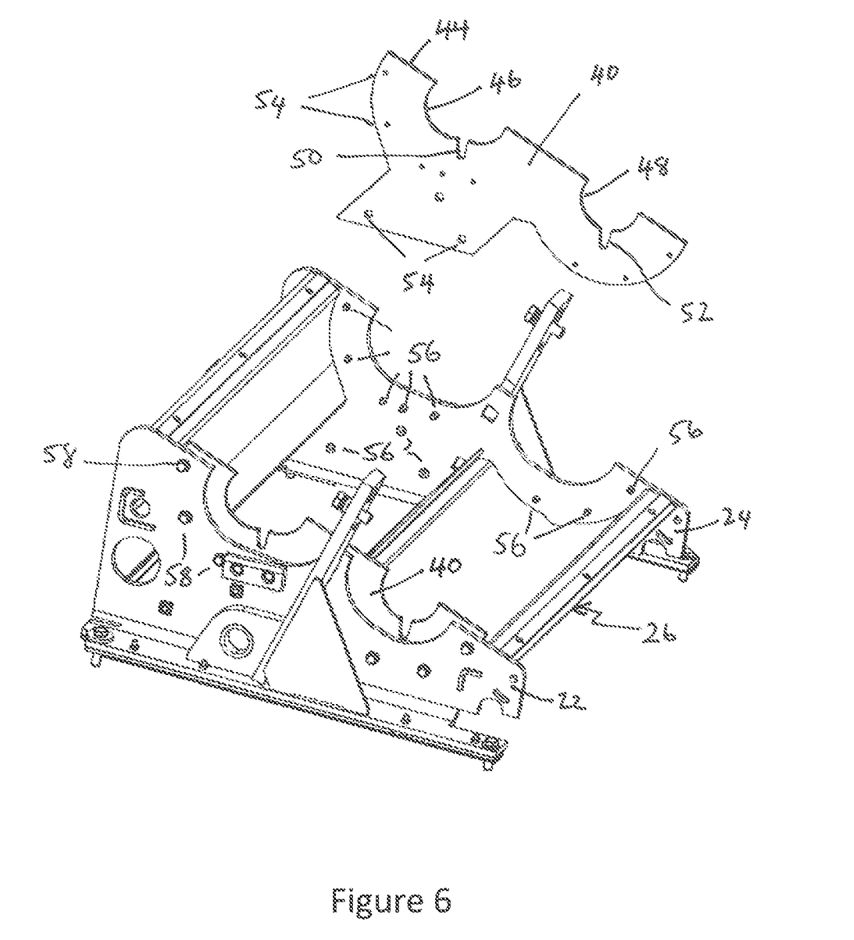
FIG. 6 shows an expanded isometric view of elements of a lower cracker unit housing of a cracker unit in accordance with the present invention.

The lower housing 10 of the cracker unit 6 comprises first and second side panels 22,24 and connecting elements 26. The connecting elements 26 extend transversely between the first and second side panels 22,24 connecting the first and second side panels 22,24 to one another.

To each side of the lower housing 10, first and second lower location plates 40 are provided. Each of the first and second lower location plates 40 are releasably secured in any suitable manner to an inner side of a respective side panel 22,24.

Figure 7:
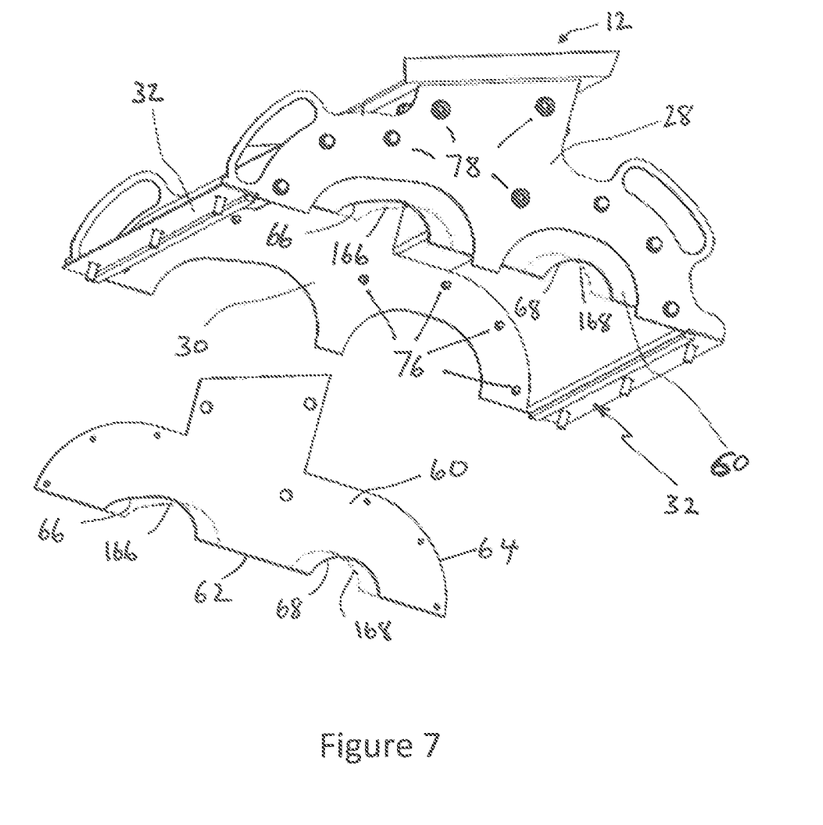
FIG. 7 shows an expanded isometric view of elements of an upper cracker unit housing of a cracker unit in accordance with the present invention.

The upper housing 12 of the cracker unit 6 comprises first and second side panels 28,30 and connecting elements 32. The connecting elements 32 extend transversely between the first and second side panels 28,30 connecting the first and second side panels 28,30 to one another.

To each side of the upper housing 12, first and second upper location plates 60 are provided. Each of the first and second upper location plates 60 are releasably secured in any suitable manner to an inner side of a respective side panel 28,30.

Each of the lower location plates 40 comprises a lower peripheral portion 42 and an upper peripheral portion 44. The dimensions of the lower peripheral portion 42 are such that the lower peripheral portion 42 fits an inner surface of the lower housing 10 of the cracker unit 6.

The upper peripheral portion 44 extends from first and second ends of the lower peripheral portion 42 in a generally linear fashion, save for two cut out portions 44,48. A first cut out portion 46 is generally part elliptical. A depending V-shaped notch 50 is provided in the first cut out portion 46. A second cut out portion 48 is generally part circular. The second cut out portion 48 is also provided with a depending V-shaped notch 52.

Each of the lower location plates 40 is conveniently secured to the adjacent side panel 22,24 by way of suitable fasteners 58 extending through suitable openings 54 provided in the lower location plates 40 and aligned openings 56 provided in the adjacent side panel 22,24.

Each of the upper location plates 60 comprises a lower peripheral portion 62 and an upper peripheral portion 64. The dimensions of the upper peripheral portion 64 are such that the upper peripheral portion 64 fits an inner surface of the upper housing 12 of the cracker unit 6.

The lower peripheral portion 62 extends from first and second ends of the upper peripheral portion 64 in a generally linear fashion, save for two cut out portions 66,68. A first of the cut out portions 66 is generally part elliptical. A second of the cut out portions 68 is generally part circular.

Each of the upper location plates 60 is secured to an adjacent side panel 28,30 of the upper housing 12 of the cracker unit 6, for example by way of suitable fasteners 78 extending through suitable openings 74 provided in the upper location plates 60 and aligned openings 76 provided in the adjacent side panel 28,30.

It will be seen that in use the generally linear portions 44,62 of the upper and lower locations are aligned. In this way the part elliptical cut outs 46,66 form a first, generally elliptical, opening, and the part circular cut outs 48,68 form a second, generally circular, opening.

Figure 5:
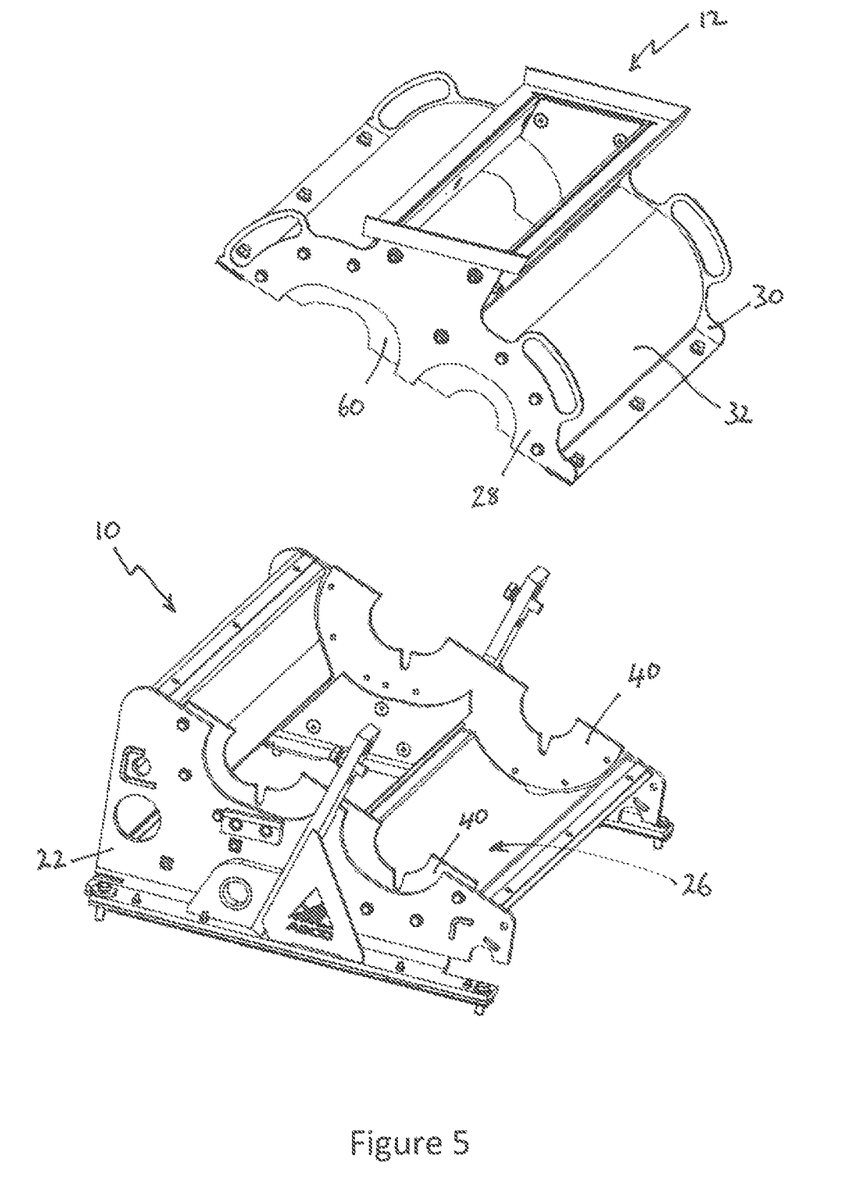
FIG. 5 shows an isometric view of certain elements of a cracker unit of a forage harvester in accordance with the present invention.
Figure 8:
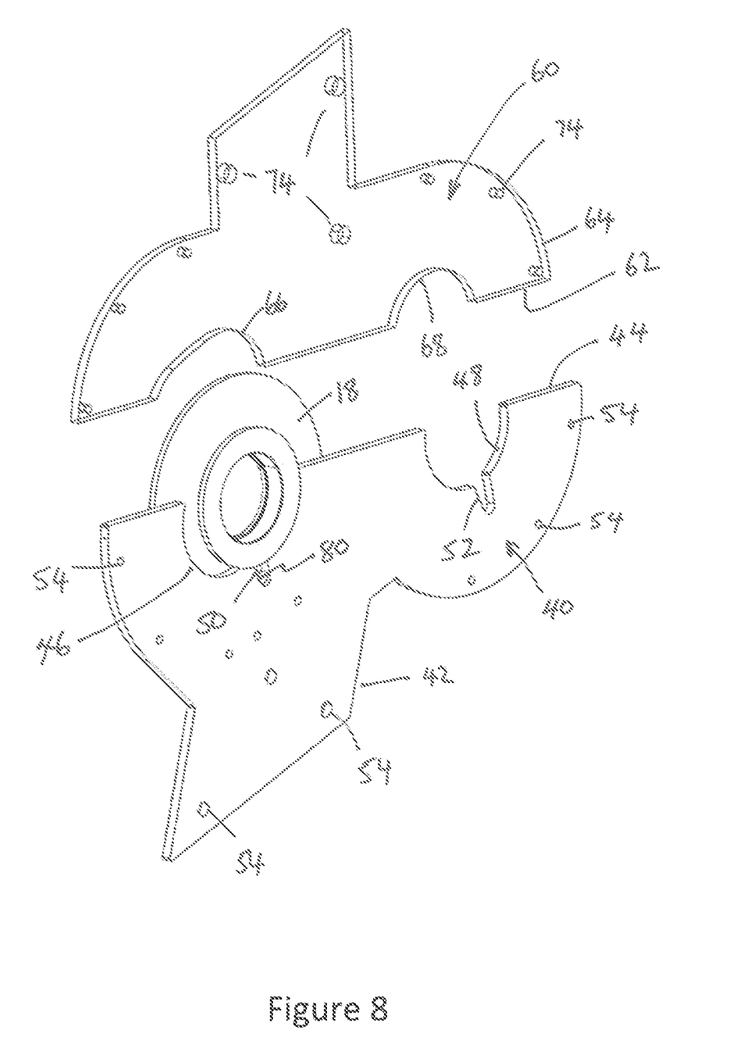
FIG. 8 shows an isometric view of an upper cracker roller sealing unit location plate and a lower cracker roller sealing unit location plate for use in a cracker unit in accordance with the present invention.

In use, the first, generally elliptical, opening and the second, generally circular, opening receive the sealing units 18 at the respective ends of the cracker rollers 14,16 (FIGS. 5 and 8). The V-shaped notches 50,52 are utilised to receive a locating pin 80 formed as part of a sealing units 18 for an end of the cracker roller with respect to the cracker unit. In use, the sealing unit 18 is pressed into contact with each of the upper and lower location plates 40,60 by the crop flow and so protects the inner surfaces of the side plates of the upper and lower housings 10,12 from damage by the processed crop.

It can be seen, in particular in FIG. 5, that the generally circular opening receives the sealing units 18 associated with the lower second cracker roller 16. This roller is fixed for rotation around a fixed axis. The generally elliptical opening receives the sealing units 18 associated with the upper first cracker roller 14. The elliptical nature of this opening allows an operator to alter the axis of rotation of the first cracker roller 14 and so control the separation of the first and second cracker rollers 14,16 as desired by an operator of the forage harvester.

Wear plates 90 (FIG. 4) may be provided in the lower housing 10 at short distance from the respective side panel 22,24. The upper dimensions of the wear plates 90 are such that, in use, they will not interfere with the rotation of the cracker roller. Similar wear plates may also be provided in the upper housing 12.

The present invention enables an operator to easily adapt the lower and upper housings 10,12 of the cracker unit 6 to cracker rollers having different roller diameters by simply replacing the lower and upper location plates 40,60 while the other elements of the lower and upper housings 10,12 can remain unaltered.

By way of example, the cut out portions 166, 168 (shown by dotted lines in FIG. 7) in the upper location plate 60 are suitable for cracker rollers with a smaller diameter than cut out portions 66,68 (shown by the unbroken lines). It can be seen that cut out portions 166, 168 are closer together than those shown by the unbroken lines. Similar altered cut out portions would be provided in a corresponding lower support plate. Such support plates would allow for replacement cracker rollers to be installed with a reduced axle to axle distance. No alteration to the side panels 28,30 of the upper housing 12 (or the side walls 22,24 of the lower housing 10) is required to facilitate the change in cracker rollers.

Further while the lower housing 10 can be removed from the forage harvester to allow for a changing of the cracker rollers, this is no longer necessary. The upper housing 12 may be removed as is known for inspection and maintenance of the cracker rollers. The existing rollers can then be removed and the associated lower location plates 40 removed. Suitable lower location plates for the replacement set of cracker rollers can be installed in lower housing 10 and the replacement set of cracker rollers installed. Before replacing the upper housing 12, the existing upper location plates are also substituted for suitable upper location plates for the replacement set of cracker rollers.

From reading the present disclosure, other modifications will be apparent to persons skilled in the art. Such modifications may involve other features which are already known in the field of forage harvesters and component parts therefore and which may be used instead of or in addition to features already described herein.

The invention claimed is:

1. A forage harvester cracker unit assembly for retention of first and second cracker rollers, each of the first and second cracker rollers having first and second ends and sealing units fitted at each of the first and second ends, the forage harvester cracker unit assembly comprising an upper housing having left and right hand sides, and a lower housing having left and right hand sides and wherein the forage harvester cracker unit assembly further comprises first and second sets of replaceable cracker roller sealing unit location plates, each set comprising an upper cracker roller sealing unit location plate and a lower cracker roller sealing unit location plate for location at a respective left or right hand side of a respective upper or lower housing, characterised in that each lower replaceable cracker roller sealing unit location plate comprises an upper linear peripheral portion and a lower peripheral portion, the upper linear peripheral portion being provided with a part elliptical cut out portion and a part circular cut out portion, each of the part elliptical cut out portion and the part circular cut out portion being provided with a depending V-shaped notch and the lower peripheral portion adapted to fit an inner surface of the lower housing of the cracker unit.

2. A forage harvester cracker unit assembly according to claim 1, characterised in that each upper replaceable cracker roller sealing unit location plate comprises a lower peripheral portion and an upper linear peripheral portion, the lower linear peripheral portion being provided with a part elliptical cut out portion and a part circular cut out portion, and the upper peripheral portion adapted to fit an inner surface of the upper housing of the cracker unit.

* * * * *